May 23, 1961  C. R. SOLOMON ET AL  2,985,466
RIGID FUEL LINE COUPLING WITH INSPECTION MEANS
Filed May 27, 1958
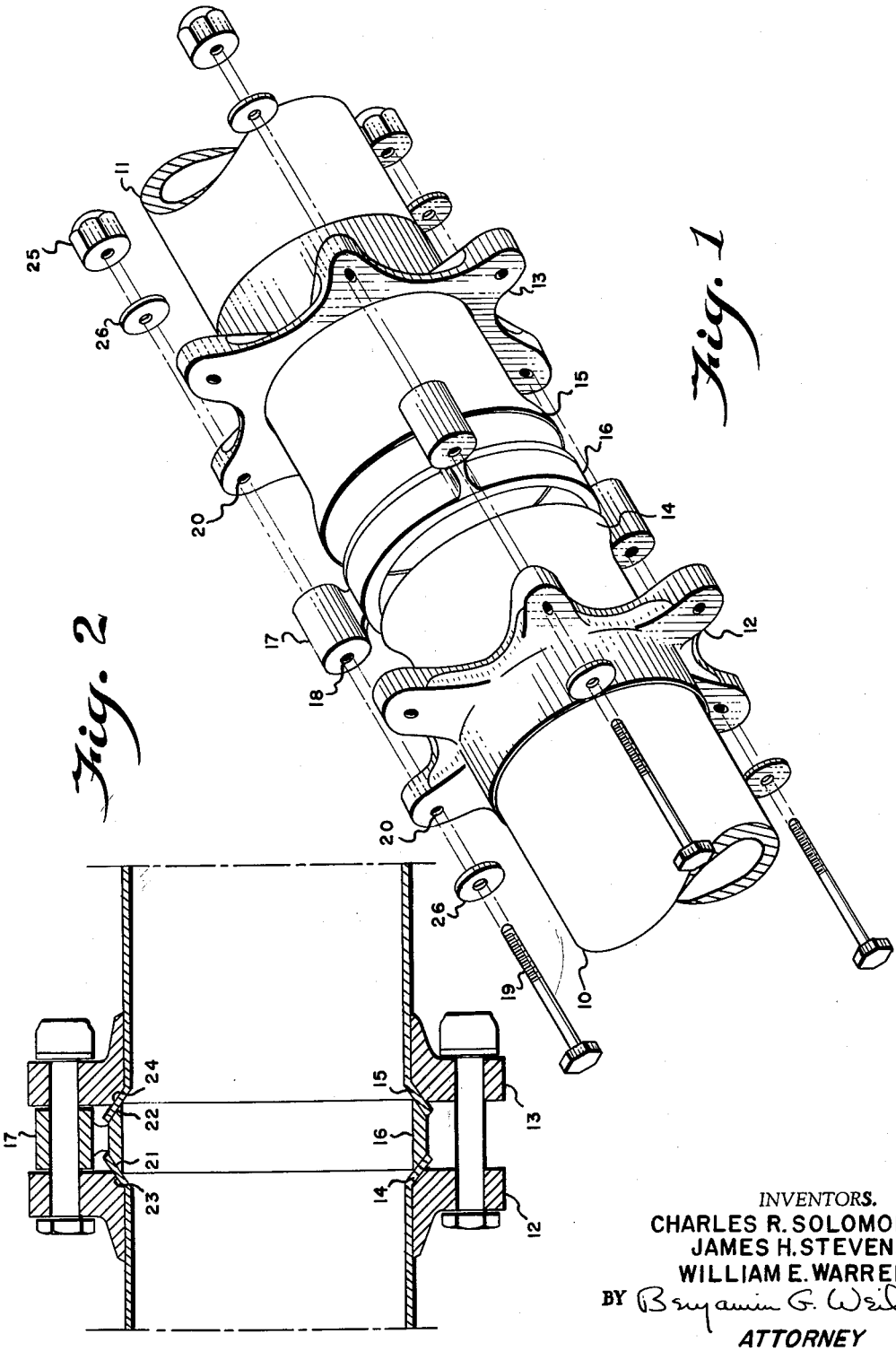
INVENTORS.
CHARLES R. SOLOMON
JAMES H. STEVENS
WILLIAM E. WARREN
BY Benjamin G. Weil
ATTORNEY

United States Patent Office 2,985,466
Patented May 23, 1961

2,985,466
RIGID FUEL LINE COUPLING WITH INSPECTION MEANS

Charles R. Solomon, Middle River, and James H. Stevens and William E. Warren, Baltimore, Md., assignors to The Martin Company, Middle River, Md., a corporation of Maryland Filed May 27, 1958, Ser. No. 738,174

2 Claims. (Cl. 285—93)

This invention relates generally to fluid line couplings and particularly to a rigid, self-aligning coupling suitable for use in aircraft.

According to conventional methods of joining tubes in a fluid line, the lengths to be joined are flared at their adjacent ends and provided with one or more threaded nut-like members which encircle the tubing. Depending upon the particular design, an externally threaded union is also provided which cooperates with the aforementioned nut-like members to draw the tube ends together. This type of connection, hereinafter referred to as the screw-on coupling, is inherently bulky and heavy. Moreover, because of its size, large wrenches are needed for tightening. Consequently, it is necessary to locate this type of coupling in an area affording sufficient working room for a large tool. These limitations are especially significant with respect to aircraft construction, wherein economy of space and weight is a foremost consideration. Heretofore, fluid lines often had to be installed in a roundabout fashion in order to insure that at every point where tubing was joined a relatively large space would be available to permit adjustments and repair of the coupling. As a result of this inefficient practice, unnecessary weight was added to the aircraft and much space was taken up by the excess tubing.

Another operation made difficult because of their design is alignment of screw-on couplings with the tubes to which they are to be joined. Improper joining resulting either from initial misalignment of tubes and coupling or from overtorquing the coupling renders the seal useless or prone to failure. In addition, without disassembling this type of coupling it is not possible to examine the seal since it is hidden from view. However, screw-on couplings may not be disassembled repeatedly without damage to the tubes. Even when a lubricating finish is interposed between the coupling and the tube flares galling will occur when the coupling is screwed together, especially if overtorqued.

A purpose of this invention, therefore, is to provide a tube coupling which is lightweight and exceptionally rigid. Moreover, by reason of its novel construction, the present coupling is used to advantage in cramped spaces where it is not possible to wield a large tool. As a result, the present coupling makes possible the more efficient installation of tubing and may be readily adjusted and repaired with tools of convenient size. This coupling is self-aligning and cannot be overtorqued. The seal may be visually inspected without disassembly, and, if necessary, may be repeatedly disassembled without damage to the tubing, so that it inherently possesses a longer service life than couplings presently available.

Other advantages and features of the present invention will become apparent upon consideration of the following specification and claims taken in conjunction with the drawing wherein:

Figure 1 is an exploded perspective view of a coupling according to this invention;

Figure 2 is a longitudinal section of the coupling in Figure 1.

Referring to the figures, two flared tubes, 10 and 11, of substantially the same diameter, are provided with flanges 12 and 13 adjacent their flared ends 14 and 15.

Intermediate flared ends 14 and 15 is positioned an annular member or seal ring 16, whose inner and outer diameters are greater than that of tubes 10 and 11. Integrated with and circumferentially equispaced about the periphery of seal ring 16 are three projections or lugs 17 having holes 18 for accommodating bolts 19 in close fit. Lugs 17 are of smaller width than seal ring 16. Washers 26 are provided adjacent the head of bolts 19 and adjacent nuts 25. The thickness of washers 26 is such that nuts 25 can only be tightened by a fixed amount, beyond which lugs 17 will bottom on flanges 12 and 13, and result in overtorquing. Holes 20 in flanges 12 and 13 are in axial alignment with corresponding holes 18 in the three lugs 17 so that, when secured by bolts 19, seal ring 16 is automatically maintained in axial alignment with tubes 14 and 15. To insure intimate contact of seal ring 16 with flared ends 14 and 15 ring edges 21 and 22 are bevelled at an angle approximately equal to the angle at which tube ends 14 and 15 are flared. Flanges 12 and 13 also have bevelled edges 23 and 24 adapted to fit against flared ends 14 and 15.

The coupling of Figure 1 is assembled by passing bolts 19 through washers 26, flanges 12 and 13 and lugs 17, and tightening nuts 25. As the coupling is tightened, flanges 12 and 13 press on flared ends 14 and 15 and force them against bevelled edges 21 and 22 of seal ring 16 to effect a tight seal. During tightening lugs 17 cooperate with bolts 19 to support ring 16 in such a manner that its axis of rotation is coincident with the central line of tubes 10 and 11. It will be readily appreciated that holes 18 should offer a close fit for bolts 19 so that ring 16 will not shimmy during assembly. As bolts 19 are tightened, then, lugs 17 will be carried thereon, positioning ring 16 parallel with tubes 10 and 11. This action of lugs 17 eliminates any misjoinder of seal ring 16 and flared ends 14 and 15, since ring 16 is prevented from shifting out of coaxial alignment with tube ends 14 and 15. The distribution of torque about seal ring 16 may be readily observed by visual inspection of the space between lugs 17 and flanges 12 and 13. Proper torque distribution is indicated by even spacing between the lugs and the flanges. Nuts 25 may be of a lock-nut variety which will not loosen when subject to vibration.

Although three lugs are shown in this exemplary embodiment of the present invention, two lugs will serve the same purpose, namely, to align ring 16 with tube ends 14 and 15. By serving as an alignment means and torque guide lugs 17 also operate to prevent galling of flanges 12 and 13 on flared ends 10 and 11. When the coupling is tightened only a small amount of the compressive force acting on flanges 12 and 13 will be exerted radially on tubes 10 and 11, the major vector being directed longitudinally against flared ends 14 and 15, thereby properly seating bevelled edges 23 and 24.

When the coupling is assembled the seal between ring 16 and tube ends 14 and 15 is plainly visible. Consequently, this type of coupling lends itself to open inspection of the joint, so that leaks are readily pinpointed as to their exact location by the simple expedient of applying a soapy mixture around the seal ring. Liquid escaping from the seal will also serve to indicate the precise area where failure has occurred.

Seal ring 16 may be made completely of metal or have a suitable resilient lining on its bevelled edges 21 and 22, for example, neoprene or Teflon. It has been found, however, that a satisfactory leak-tight seal is formed when the bevelled edges of the seal ring and the flared ends of the tubing are properly finished, so as to present regular mating surfaces.

The total number of bolts required for securing the present coupling will depend on tube size and fluid pressure. However, at least two bolts circumferentially equispaced about the seal ring must pass through lugs on the seal ring. By being adapted for use with a multiplicity of bolts the present coupling is more reliable than standard couplings and need not be inspected as frequently.

Flanges of different design than those shown in the drawing can be used, and the flange bevel seating may vary with tube size. For example, in joining tubing of 2 inch outer diameter it is preferred to bevel the flange seating and the seal ring edges of an angle of 33°, and to form a 37° flare on the tubing. Persons skilled in the art will realize what configurations are most suitable in particular instances.

A comparative evaluation was made of six of the present couplings (designated as Type A) and four standard AN couplings (designated as Type B). The Type B coupling, made according to Army-Navy specifications, is composed of five parts; a flared tube union, two sleeves which fit over the tubing and two nuts which slide over the sleeves and screw onto the union. The couplings were used on aluminum alloy tubing, 2.5 inches outside diameter and 0.065 inch wall thickness. Assembled, the Type A coupling was 2³⁄₁₆ inches long and weighed one pound. The assembled length of Type B coupling was 5¼ inches and the weight, three pounds. Both Type A and Type B couplings were manufactured from aluminum alloy.

Two series of tests were conducted: (1) repeated assembly and disassembly, and (2) vibration and circulation. The mating surfaces of all flares were treated with lubricant, as were the threads on Type B couplings.

After three assemblies each coupling was tested at 500 p.s.i.g. liquid pressure. A leak was noted immediately in one Type B coupling, and after five minutes at this pressure, all Type B couplings showed signs of seeping. No Type A coupling developed a leak.

A vibration table was used for the second series of tests. Test liquid at 250 p.s.i.g. was circulated through the couplings and the vibration table was started at 2,000 cycles per minute. Vibration was continued for eight hours when circulation and vibration were stopped and the couplings cold-soaked at 40° F. for one hour. After the cold-soaking treatment circulation and vibration at ambient temperature were resumed for another eight hours. Alternating vibration and soaking treatments were continued in this manner until a total of 2000 hours of vibration were logged. After 95 hours of vibration all Type B couplings had failed. At the end of 160 hours of vibration one Type A coupling showed signs of wetness, but even after 200 hours of vibration there was not enough leakage to form a drip. None of the other Type A couplings exhibited any signs of leakage.

Having thus provided a written description of our invention and a specific example thereof, it is to be understood that the scope of the invention is defined by the appended claims.

We claim:

1. A high pressure coupling for joining in sealed relation the adjacent outward ends of two tubes, each tube having the wall section at the adjacent ends thereof outwardly beveled to form a conical inner and outer surface, comprising two flange members each slidably mounted on a respective one of the tubes and each having a beveled inner circumferential surface adapted to complementarily bear against the confronting outer surface of the corresponding beveled end, a seal ring disposable between the tubes whose outer bounding face is provided with two spaced circumferential beveled surfaces adapted to bear against the respective inner surfaces of the confronting beveled ends of the tubes, the latter surfaces each being respectively complementary to the beveled inner surface of a flange member, said flange members being provided with means equally spaced about the periphery thereof for receiving a plurality of spaced bolts, said bolts being arranged to extend between the flange members for drawing said members toward one another and in mutually spaced relationship so as to compress in fluid tight relation said flared ends between the beveled surfaces on said flange members and the beveled surfaces on said seal ring, a plurality of spacers secured to and disposed about the periphery of said seal ring in equally spaced relation about the periphery thereof to serve as alignment means, each of said alignment means having means disposed therethrough to receive in closely fitting relation therewith one of said bolts extending between said flange members so as to constrain said seal ring against misalignment with respect to the flared ends of the tubes as said bolts are tightened, the juncture between each flange member, its respective flared tube end, and said seal ring being visible for inspection even after said bolts are fully tightened, said spacers being of a dimension in the direction of said bolts only slightly less than the dimension between adjacent portions of said flange members when said bolts have been fully tightened, said alignment means thereby preventing misalignment of said seal ring with respect to the flared ends of the tubes by virtue of the fact that an overtightened bolt cannot pull said flange members substantially out of the proper alignment, whereby said alignment means maintains said seal ring in the proper circumferential position while at the same time making unnecessary any extreme case as to the procedure of tightening said bolts.

2. The coupling arrangement as defined in claim 7 in which said spacers are integral lugs, with at least some of said lugs having therein a hole disposed in the direction of said bolts and being of a diameter only slightly greater than the diameter of a bolt used to draw said flange members together, whereby when one of said bolts has been inserted through each of said holes and subsequently tightened in substantial conformity with the remainder of said bolts extending between said flange members, said lugs insure the proper radial disposition of said seal ring as well as the perpendicularity of said seal ring with respect to the axis of said bolts.

References Cited in the file of this patent

UNITED STATES PATENTS

| 2,303,311 | Gredell | Nov. 24, 1942 |

FOREIGN PATENTS

| 1,607 | Great Britain | Jan. 27, 1892 |
| 341,609 | Great Britain | Jan. 22, 1931 |
| 496,089 | Belgium | June 30, 1950 |